US 10,635,150 B2

(12) United States Patent
Elghrawi et al.

(10) Patent No.: US 10,635,150 B2
(45) Date of Patent: Apr. 28, 2020

(54) ELECTRICAL POWER SUPPLY DEVICE AND METHOD OF OPERATING SAME

(71) Applicant: Delphi Technologies, LLC, Troy, MI (US)

(72) Inventors: Mohamad Elghrawi, Sterling Heights, MI (US); Robert M. Voto, Clarkston, MI (US)

(73) Assignee: Aptiv Technologies Limited (BB)

( * ) Notice: Subject to any disclaimer, the term of this patent is extended or adjusted under 35 U.S.C. 154(b) by 207 days.

(21) Appl. No.: 15/954,851

(22) Filed: Apr. 17, 2018

(65) Prior Publication Data

US 2019/0317581 A1 Oct. 17, 2019

(51) Int. Cl.
| | |
|---|---|
| *G06F 13/28* | (2006.01) |
| *G06F 1/26* | (2006.01) |
| *B60R 16/03* | (2006.01) |
| *G05B 15/02* | (2006.01) |

(52) U.S. Cl.
CPC .............. *G06F 1/266* (2013.01); *B60R 16/03* (2013.01); *G05B 15/02* (2013.01)

(58) Field of Classification Search
CPC ....... H02J 2007/0062; H02J 2007/0096; H02J 7/1446; G06F 1/266; G05B 15/02; B60R 16/03
See application file for complete search history.

(56) References Cited

U.S. PATENT DOCUMENTS

| | | | | |
|---|---|---|---|---|
| 2011/0287732 | A1* | 11/2011 | Kakuya | H03H 7/40 455/334 |
| 2015/0032934 | A1* | 1/2015 | Jhong | G06F 1/266 710/316 |
| 2015/0069957 | A1* | 3/2015 | Chang | H02J 7/0052 320/107 |
| 2017/0155266 | A1* | 6/2017 | Namou | H02J 7/0057 |

FOREIGN PATENT DOCUMENTS

| | | |
|---|---|---|
| DE | 102004023620 A1 | 12/2005 |
| EP | 3043442 A1 | 7/2016 |
| EP | 3270480 A1 | 1/2018 |
| JP | 3892528 B2 | 3/2007 |

* cited by examiner

*Primary Examiner* — Alfonso Perez Borroto
*Assistant Examiner* — Esayas G Yeshaw
(74) *Attorney, Agent, or Firm* — Robert J. Myers

(57) ABSTRACT

An electrical power supply device includes a DC-DC power convertor receiving an input voltage and producing a first output voltage or a second output voltage that is less than the first output voltage, the first and second output voltage each less than the input voltage and a device controller in communication with the DC-DC power convertor. The device controller has one or more processors and memory. The memory includes instructions which causes the device controller to command the DC-DC power convertor to output the first output voltage when the input voltage is equal to or greater than a threshold voltage and which causes the device controller to command the DC-DC power convertor to output the second output voltage when the input voltage is (Continued)

less than the threshold voltage. A method of operating the electrical power supply device is also presented.

14 Claims, 3 Drawing Sheets

ELECTRICAL POWER SUPPLY DEVICE AND METHOD OF OPERATING SAME

TECHNICAL FIELD OF THE INVENTION

The invention generally relates to an electrical power supply device and method of operating the electrical power supply device.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
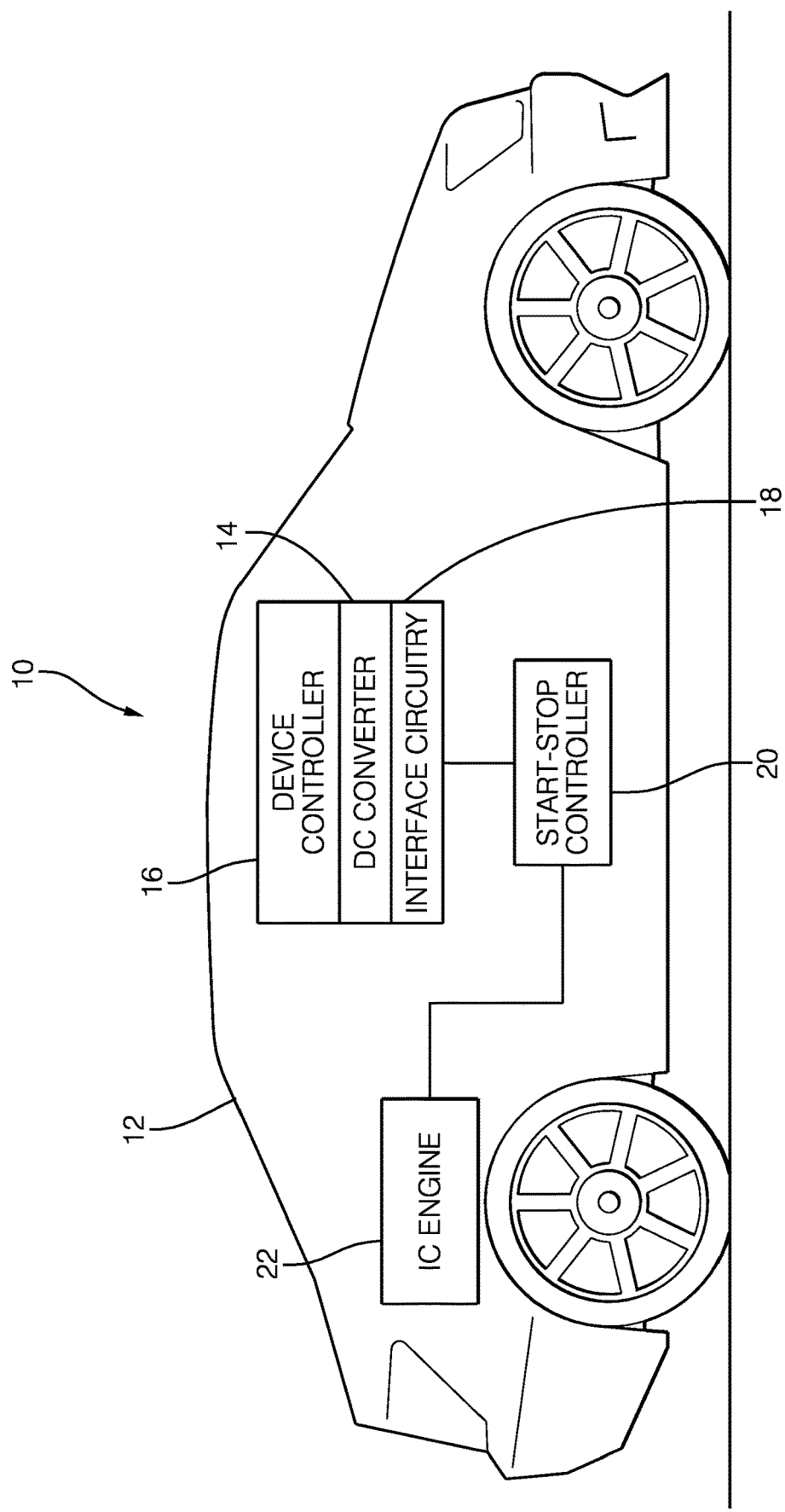
FIG. 1 is a schematic diagram of an electrical power supply device, according to one embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The Universal Serial Bus (USB) has evolved from a data interface capable of supplying limited power to a primary provider of power with a data interface. Today many devices charge or get their power from USB ports contained in laptops, cars, aircraft or even wall sockets. USB has become a ubiquitous power socket for many consumer devices such as cellular telephones, digital media players and/or other hand-held devices. Users utilize USB to fulfil their requirements not only in terms of data but also to provide power to, or charge, their devices simply, often without the need to load a driver, in order to carry out "traditional" USB functions.

The USB Power Delivery (PD) Specification enables the maximum functionality of USB by providing more flexible power delivery, e.g. for battery charging, along with data over a single cable. Its aim is to operate with and build on the existing USB ecosystem. The USB Power Delivery Specification 3.0 is published by the USB Implementer's Forum, Inc and is incorporated by reference herein.

Prior implementations of USB PD devices conforming to the USB Power Delivery Specification in automotive applications have used a "buck/boost" DC-DC power converter to generate voltages from 5 volts to 20 volts which are both above and below the typical vehicle input voltage of 12 to 14 volts. Buck/boost DC-DC converters capable of supplying a DC output voltage that is greater or less than the input voltage are more expensive, physically larger, and are less energy efficient than a buck only DC-DC converter which can only supply a DC output voltage that is less than the input voltage. The inventors propose a high efficiency, low cost, entry level USB PD device herein using a buck only DC-DC converter design.

In order to meet stringent fuel economy and emission standards, automotive original equipment manufacturers (OEMs) have included start-stop technology in their vehicles that automatically shuts down and restarts the internal combustion engine to reduce the amount of time the engine spends idling, thereby reducing fuel consumption and emissions of the vehicle.

OEMs have imposed requirements for a USB PD device and other automotive electrical modules powered by the vehicle battery requires it to meet "Start/Stop" transient tests in which the vehicle battery voltage temporarily dips down to as low as 6 volts to simulate the vehicle cranking during a warm start. During this transient, the USB PD device is expected to continue to function with no disruption to the consumer experience. With only a 6 volt input voltage during the transient, it is not possible for a buck only DC-DC converter to maintain an output voltage higher than the input voltage, e.g. 9 volts, to the consumer device while being charged.

A proposed innovative solution is to provide a signal from the vehicle to the USB PD device to indicate the power state of the vehicle. During the normal vehicle run mode the vehicle voltage is expected to be typically in the 12-14V range and a buck only DC-DC converter can generate a 9 volt output used by the consumer charging device in a fast charge mode. When the vehicle enters the stop/start mode, i.e. the vehicle has stopped moving and automatically turns off the engine, the change in mode is communicated by a signal from the vehicle to a controller in the USB PD device and the USB PD device then renegotiates the charging contact with the consumer device to provide a 5 volt output voltage for normal charging operation. When the car subsequently experiences a crank cycle transient, the buck converter is able to maintain the 5 volt output without interrupting the charging session. After the engine starts and returns to the run mode, the USB PD device is again notified via another signal and returns to a 9 volt output. This innovation provides offer a lower cost "entry level" PD solution to customers that are not interested in a full featured and higher cost USB PD device.

FIG. 1 illustrates an electrical power supply device, e.g. a Universal Serial Bus (USB) power delivery (PD) device, hereinafter referred to as the PD device 10 that is designed for use in a motor vehicle 12. The PD device 10 may be used to support battery charging of USB enabled devices in the vehicle 12 (not shown). The PD device 10 includes a buck-only DC-DC power convertor, hereinafter referred to as the DC convertor 14, that receives an input voltage from a vehicle's electrical system. The output voltage can by one of at least two different voltages, e.g. a 9 volt output to support a fast USB charge rate or a 5 volt output to support a normal USB charge rate. The DC convertor 14, being a buck-only DC-DC power convertor, is incapable of providing an output voltage that is greater than the input voltage.

The PD device 10 also includes a device controller 16 in communication with the DC convertor 14. The device controller 16 has one or more processors and memory. The processors may be a microprocessors, application specific integrated circuits (ASIC), or built from discrete logic and timing circuits (not shown). Software instructions that program the processors may be stored in a non-volatile (NV) memory device (not shown). The NV memory device may be contained within the microprocessor or ASIC or it may be a separate device. Non-limiting examples of the types of NV memory that may be used include electrically erasable programmable read only memory (EEPROM), masked read only memory (ROM), and flash memory. The memory stores instructions which causes the device controller 16 to command the DC convertor 14 to output the higher output voltage, e.g. 9 volts, when the input voltage is equal to or greater than a threshold voltage and which causes the device controller 16 to command the DC convertor 14 to output the lower output voltage, e.g. 5 volts, when the input voltage is or will be less than the threshold voltage. The threshold voltage is greater than or equal to the higher output voltage.

The PD device 10 also includes interface circuitry 18, such as a controller area network (CAN) transceiver, a local interconnect network (LIN) transceiver, a USB transceiver, and/or an input voltage detection circuit, e.g. an analog/digital convertor circuit, to allow the PD device 10 to establish electrical communication with other devices within the vehicle 12.

In an embodiment that includes the input voltage detection circuit, this circuit is in communication with the vehicle power supply, e.g. vehicle battery (not shown) and the device controller 16 and is configured to determine the input voltage to the PD device 10 from the vehicle battery and transmit that information to the device controller 16. The memory includes additional instructions which cause the device controller 16 to command the DC convertor 14 to output the higher output voltage, e.g. 9 volts, when the input voltage detection circuit determines that the input voltage is greater than the threshold voltage, e.g. 9.5 or 10 volts and which cause the device controller 16 to command the DC convertor 14 to output the lower output voltage, e.g. 5 volts, when the input voltage detection circuit determines that the input voltage is less than the threshold voltage.

In another embodiment, the PD device 10 is in communication with a start-stop controller 20 via the CAN transceiver, the LIN transceiver. The memory further includes instructions which cause the device controller 16 to command the DC convertor 14 to output the higher output voltage in accordance with the device controller 16 receiving a run signal from the start-stop controller 20. The reception of the run signal causes the device controller 16 to command the DC convertor 14 to output the lower output voltage in accordance with the device controller 16 receiving a stop signal from the start-stop controller 20. The run signal indicates that the IC engine 22 is running, therefore the input voltage will remain equal to or greater than the threshold voltage. The stop signal indicates that the IC engine 22 is not running and that the input voltage may drop to less than the threshold voltage, e.g. during a cranking transient.

In yet another embodiment, the PD device 10 is disposed within a USB port that is in communication with a USB hub. The memory includes instructions which cause the device controller 16 to command the DC convertor 14 to output the higher output voltage in accordance with the device controller 16 receiving a first USB signal from the USB hub indicating that the input voltage will remain equal to or greater than the threshold voltage and which cause the device controller 16 to command the DC convertor 14 to output the lower output voltage in accordance with the device controller 16 receiving a second signal from the USB hub indicating that the input voltage may drop to less than the threshold voltage.

Figure 2:
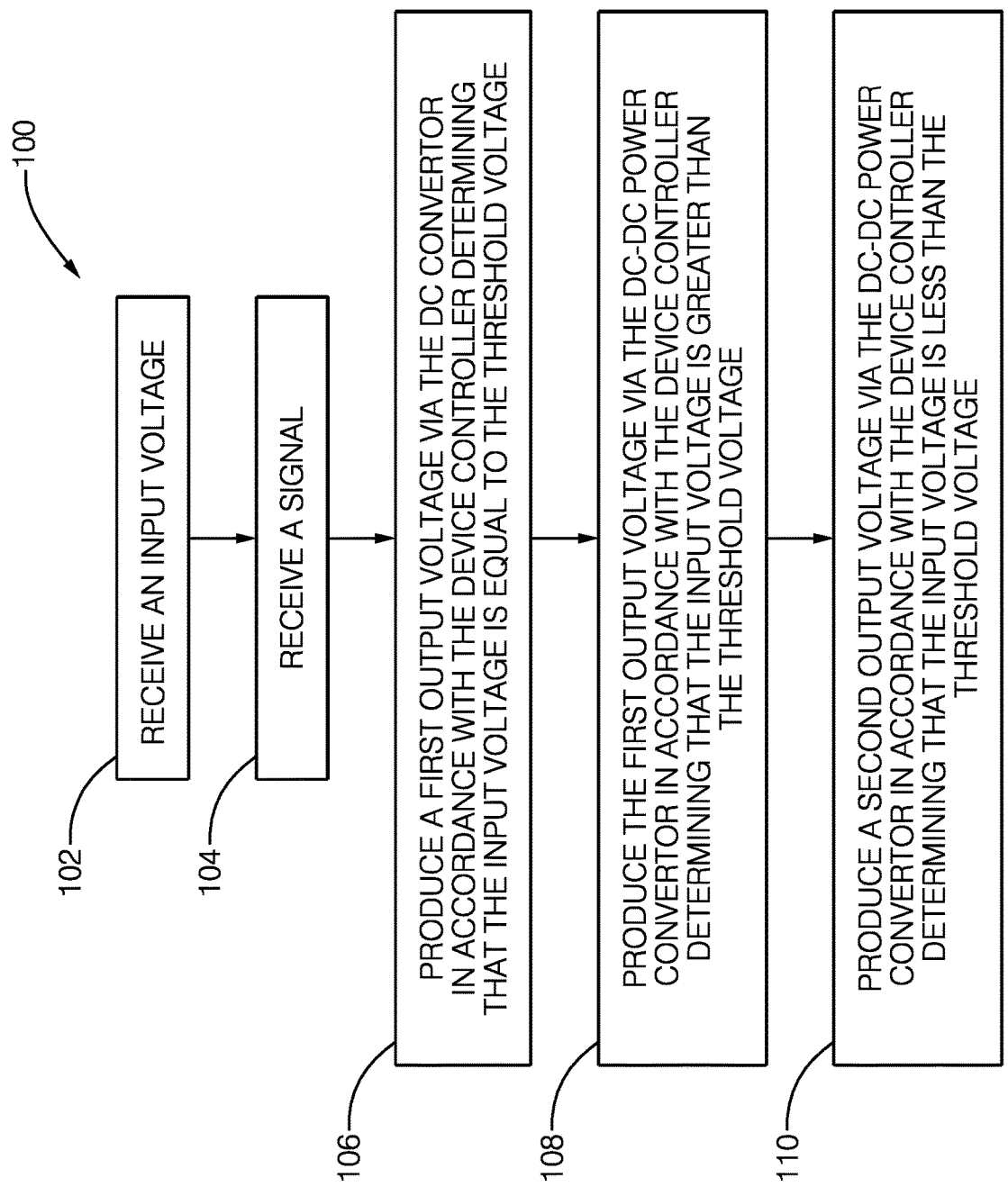
FIG. 2 is a flow chart of a method of operating the electrical power supply device, according to one embodiment.

FIG. 2 illustrates a method 100 of operating the PD device 10 which includes the DC convertor 14 and the device controller 16. The method 100 includes the following steps:

STEP 102, RECEIVE AN INPUT VOLTAGE, includes the PD device 10 receiving an input voltage from an electrical power source, e.g. a vehicle electrical system;

STEP 104, RECEIVE A SIGNAL, includes the PD device 10 receiving a signal indicative of whether the input voltage is equal to, greater than, or less than a threshold voltage;

STEP 106, PRODUCE A FIRST OUTPUT VOLTAGE VIA THE DC CONVERTOR IN ACCORDANCE WITH THE DEVICE CONTROLLER DETERMINING THAT THE INPUT VOLTAGE IS EQUAL TO THE THRESHOLD VOLTAGE, includes the PD device 10 producing a higher output voltage, e.g. 9 volts, via the DC convertor 14 in accordance with the device controller 16 determining that the input voltage is equal to the threshold voltage;

STEP 108, PRODUCE THE FIRST OUTPUT VOLTAGE VIA THE DC-DC POWER CONVERTOR IN ACCORDANCE WITH THE DEVICE CONTROLLER DETERMINING THAT THE INPUT VOLTAGE IS GREATER THAN THE THRESHOLD VOLTAGE, includes the PD device 10 producing the higher output voltage via the DC convertor 14 in accordance with the device controller 16 determining that the input voltage is greater than the threshold voltage; and STEP 110, PRODUCE A SECOND OUTPUT VOLTAGE VIA THE DC-DC POWER CONVERTOR IN ACCORDANCE WITH THE DEVICE CONTROLLER DETERMINING THAT THE INPUT VOLTAGE IS LESS THAN THE THRESHOLD VOLTAGE, includes the PD device 10 producing a second output voltage via the DC convertor 14 which is less than the first output voltage in accordance with the device controller 16 determining that the input voltage is less than the threshold voltage.

The first and second output voltage are each less than the input voltage. The threshold voltage is greater than or equal to the first output voltage.

Figure 3:
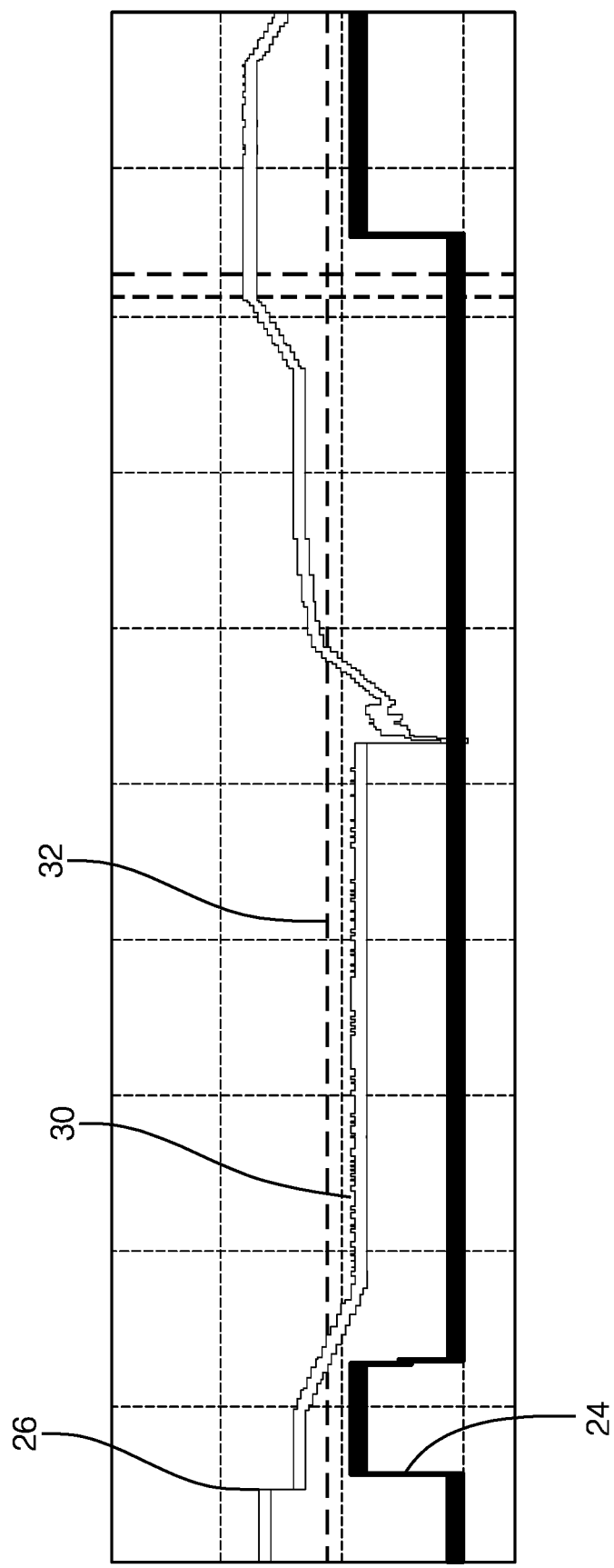
FIG. 3 is a graph of an input voltage and an output voltage of the electrical power supply device, according to one embodiment.

According to a particular embodiment, as illustrated in FIG. 3 if the PD device 10 has negotiated a PD contract with a consumer device (not shown) at 27 watts i.e. output voltage 24 is 9V and current capacity is 3 A and a start-stop event 26 occurs in the vehicle 12, the PD device 10 will change the power negotiation from 27 watts to 15 watts, i.e. output voltage 24 is 5V and current capacity is 3 A. Per the USB PD specifications the consumer device will choose the new 15 watt capability. After the stop-start event ends 30, the PD device 10 will renegotiate 27 W capability and the consumer device will choose highest power needed.

In this embodiment, the input voltage 30 is monitored constantly by the PD device 10. If the input voltage 30 drops to the voltage threshold 32, the PD device 10 will negotiate a 15 watt only contract with the consumer device. If the input voltage 30 rises above the voltage threshold 32, PD device 10 will negotiate a 27 watt contract with the consumer device.

Inn an alternative embodiment the PD device 10 receives a start-stop signal, e.g. a CAN/LIN/discrete) signal from the vehicle 12 and negotiates a 15 watt contract with the consumer device when the stop-start signal is received, and negotiates a higher power, e.g. 27 watt, contract when the start-stop signal is no longer received or a signal indicating the completion of the start-stop event is received.

Accordingly, an electrical power supply device, e.g. a USB PD device 10, and a method 100 of operating such a device is provided. The device provides the benefit of a USB PD device 10 that is capable of reliable operation in a motor vehicle 12 having a start-stop system at a lower cost than prior USB PD device designs.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An electrical power supply device, comprising:
a DC-DC power convertor receiving an input voltage and producing a first output voltage or a second output voltage that is less than the first output voltage, the first and second output voltage each less than the input voltage; and
a device controller in communication with the DC-DC power convertor, said device controller having one or more processors and memory, wherein the memory includes instructions which causes the device controller to command the DC-DC power convertor to output the first output voltage when the input voltage is equal to or greater than a threshold voltage and which causes the device controller to command the DC-DC power convertor to output the second output voltage when the input voltage is less than the threshold voltage.

2. The electrical power supply device according to claim 1, wherein the threshold voltage is greater than or equal to the first output voltage.

3. The electrical power supply device according to claim 2, wherein the DC-DC power convertor is incapable of providing an output voltage that is greater than the input voltage.

4. The electrical power supply device according to claim 3, wherein the electrical power supply device further comprises an input voltage detection circuit in communication with the device controller and wherein the memory includes additional instructions which causes the device controller to command the DC-DC power convertor to output the second output voltage when the input voltage detection circuit determines that the input voltage is less than the threshold voltage.

5. The electrical power supply device according to claim 3, wherein the electrical power supply device is disposed within an automobile having a start-stop controller in communication with the device controller, wherein the memory further includes instructions which cause the device controller to command the DC-DC power convertor to output the first output voltage in accordance with the device controller receiving a run signal from the start-stop controller, and wherein the memory additionally includes instructions which cause the device controller to command the DC-DC power convertor to output the second output voltage in accordance with the device controller receiving a stop signal from the start-stop controller.

6. The electrical power supply device according to claim 5, wherein the start-stop controller is connected to the device controller by a controller area network (CAN) communication bus.

7. The electrical power supply device according to claim 5, wherein the start-stop controller is connected to the device controller by a local interconnect network (LIN) communication bus.

8. The electrical power supply device according to claim 5, wherein the run signal indicates that the input voltage will remain equal to or greater than the threshold voltage and the stop signal indicates that the input voltage may drop to less than the threshold voltage.

9. The electrical power supply device according to claim 3, wherein the electrical power supply device is disposed within a universal serial bus (USB) port in communication with a USB hub, wherein the memory further includes instructions which cause the device controller to command the DC-DC power convertor to output the first output voltage in accordance with the device controller receiving a first USB signal from the USB hub indicating that the input voltage will remain equal to or greater than the threshold voltage, and wherein the memory additionally includes instructions which cause the device controller to command the DC-DC power convertor to output the second output voltage in accordance with the device controller receiving a second signal from the USB hub indicating that the input voltage may drop to less than the threshold voltage.

10. The electrical power supply device according to claim 1, wherein the first output voltage is about 9 volts and the second output voltage is about 5 volts.

11. A method, comprising:

providing a device controller and a DC-DC power convertor in communication with the device controller, said device controller having one or more processors and memory:

receiving an input voltage;

receiving a signal indicative of whether the input voltage is equal to, greater than, or less than a threshold voltage;

producing a first output voltage via the DC-DC power convertor in accordance with the device controller determining that the input voltage is equal to the threshold voltage;

producing the first output voltage via the DC-DC power convertor in accordance with the device controller determining that the input voltage is greater than the threshold voltage; and producing a second output voltage via the DC-DC power convertor which is less than the first output voltage in accordance with the device controller determining that the input voltage is less than the threshold voltage, wherein the first and second output voltage are each less than the input voltage.

12. The method according to claim 11, wherein the threshold voltage is greater than or equal to the first output voltage.

13. The method according to claim 12, wherein the DC-DC power convertor is incapable of providing an output voltage that is greater than the input voltage.

14. The method according to claim 11, wherein the first output voltage is about 9 volts and the second output voltage is about 5 volts.

* * * * *